E. B. TOLMAN, Jr.
AUXILIARY CHANGE SPEED DEVICE.
APPLICATION FILED SEPT. 16, 1915.
1,166,020.
Patented Dec. 28, 1915.
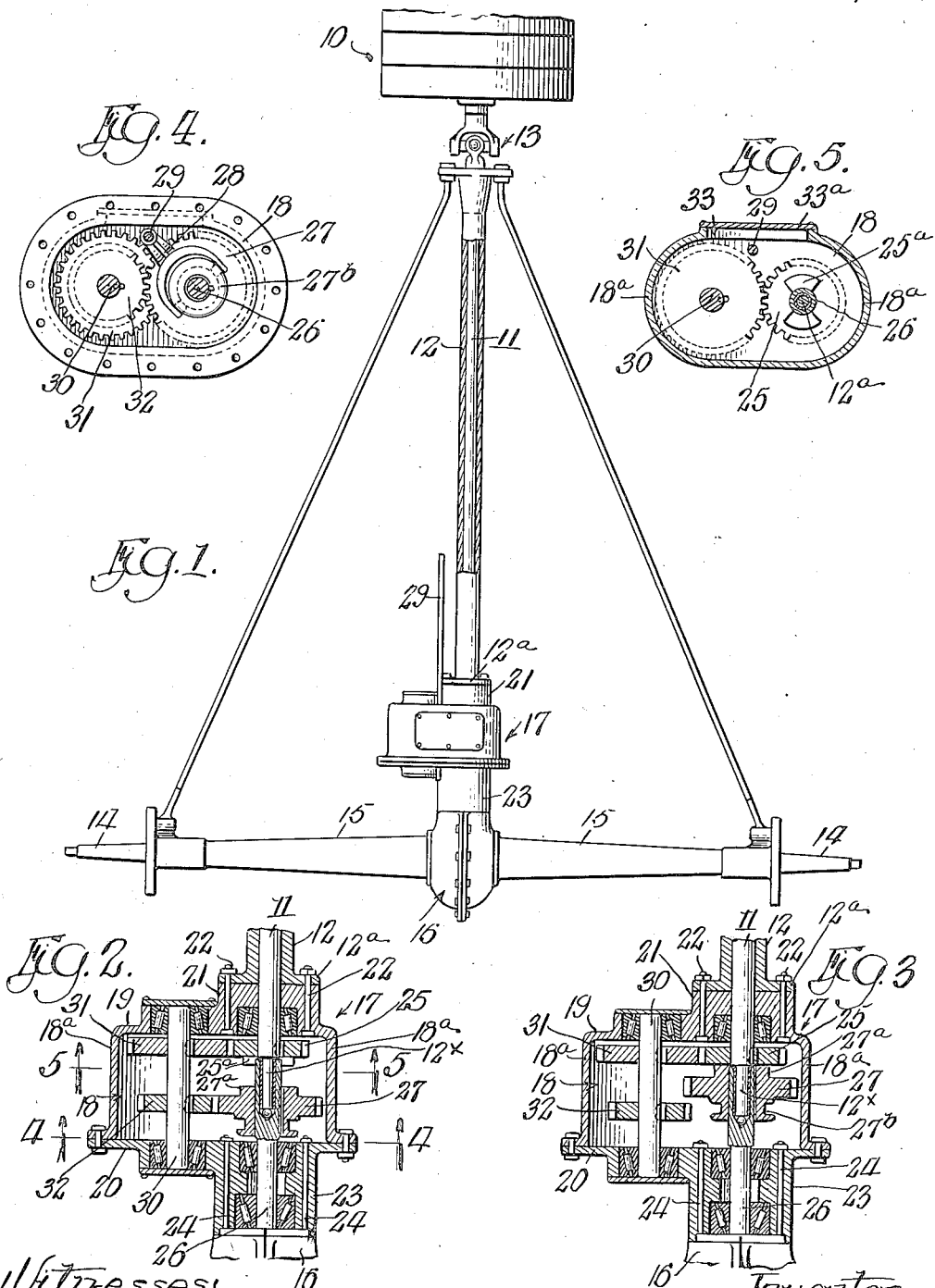
Witnesses:
Inventor
Edgar B. Tolman Jr.

UNITED STATES PATENT OFFICE.

EDGAR B. TOLMAN, JR., OF CHICAGO, ILLINOIS.

AUXILIARY CHANGE-SPEED DEVICE.

1,166,020.

Specification of Letters Patent. Patented Dec. 28, 1915.

Application filed September 16, 1915. Serial No. 50,974.

*To all whom it may concern:*

Be it known that I, EDGAR B. TOLMAN, Jr., a citizen of the United States, and a resident of Chicago, in the county of Cook and State of Illinois, have invented certain new and useful Improvements in Auxiliary Change-Speed Devices; and I do hereby declare that the following is a full, clear, and exact description thereof, reference being had to the accompanying drawings, and to the letters of reference marked thereon, which form a part of this specification.

This invention relates to an improved auxiliary change-speed device for use with transmission gearing and is shown herein and is more particularly intended for application to such gearing in an automobile.

The invention consists of the matters hereinafter described and more particularly pointed out in the appended claim.

The object of the invention is to provide an auxiliary change-speed device by means of which the several speeds provided by the ordinary transmission gearing in an automobile may each be successively reduced by means of an auxiliary control without changing the main transmission gearing, from high to low or the reverse.

As an example, some of the large manufacturers of automobiles, in order to reduce the cost of manufacture, to facilitate the output of a large number of cars and to simplify the manipulation of the change-speed gearing for the operator so that a novice may drive the car, have found it advantageous to produce automobiles having only two speeds forward and one reverse, with gear reductions therein which approximately satisfy normal requirements under ordinary conditions. With automobiles so equipped, however, it is manifest that both speeds, that is to say, the high speed and low speed, are limited by reason of the fact that such a variety of conditions will arise with the many cars thus equipped. Thus the high speed cannot be made as high as would many times be of great advantage in running some of the cars and also the low speed cannot be made as low as might often be found to be of use in running other cars.

With the use of my improved device, however, the high speed may be materially raised so as to get a much greater speed on level ground than is now possible with cars capable of only two speeds as now manufactured, while at the same time the necessary intermediary speeds between this relatively high speed and the low speed of the transmission gearing may be obtained. In addition, speed reductions below the low speed may be made so that the low speed may be placed higher than it would ordinarily be in cases where but the two primary speeds, high and low, are provided in the transmission gearing.

When installed or attached in place, my new device may, by a single movement of an operating lever, be brought into and out of operation. When brought into operation, additional speed reductions become available. Whether my speed-change gearing is in operation or not, the control of the car is in all respects the same.

The advantages, economy and simplicity of manipulation which are characteristic of say, for example, a two speed planetary transmission are retained, but said advantages are supplemented by the further advantage of a four change-speed gearing, which is now installed only on high priced cars.

In the drawings: Figure 1 is a view in plan elevation of the running gear of an automobile, showing my improved change-speed gearing as attached in place. Fig. 2 is a horizontal sectional view through my improved change-speed gearing device. Fig. 3 is a view similar to Fig. 2 showing the parts in a changed relation. Fig. 4 is a transverse section view through my improved gearing device, the plane of the section being indicated by the line 4—4 of Fig. 2. Fig. 5 is a view similar to Fig. 4, the plane of the section being indicated by the line 5—5 of Fig. 2.

Referring now to that embodiment of my invention as illustrated in the accompanying drawings:—10 indicates a speed transmission device for an automobile, the same being, as shown in the drawings, of the planetary type.

11 indicates the drive or propeller shaft mounted within an associated tubular housing 12 and operatively connected to said speed transmission device in a familiar manner by means of a universal joint 13.

14 indicates the rear driving axle of the automobile which has suitable bearing in an axle housing 15. Said axle is operatively connected with said drive shaft 11 by means of the usual differential gearing (not shown) inclosed by the differential case 16.

17 indicates as a whole my improved auxiliary change-speed device, which, as illustrated in the drawings, is interposed between the drive shaft 11 and the rear axle 14 in such a manner as to permit a plurality of speeds of said rear axle with reference to each speed imparted to the drive shaft 11 by the speed transmission device 10, before mentioned. The said change speed device comprises a casing 18, having flat top and bottom walls, semi-cylindric side walls 18ª, an integral front end wall 19 and a removably attached rear end wall 20 which end walls provide means by which the device as a whole may be interposed or attached in the running gear of the automobile upon which it is to be installed in the following manner. The front end wall 19 of the casing 18 is provided with an annular boss or extension 21 in which are provided suitable lag screws or bolts 22 by means of which the casing as a whole is attached to a radial flange 12ª formed at the rear end of the drive shaft housing 12.

The removably attached rear wall 20 of the casing has a similar extension 23 arranged coaxially with respect to the extension 21 and in which are provided suitable apertures for the reception of lag screws or bolts 24 fixed in the differential gear casing 16 and by means of which the casing 18 is attached or fixed to said differential gear housing. The extension 23 replaces a tubular roller bearing housing providing a bearing for the rear end of the shaft 12, the lag screws 24 originally passing through suitable apertures therein and through the flange 12ª to secure the parts in proper position.

The drive shaft 12 is journaled in an anti-friction bearing in the extension 21 of the casing 18 and said shaft is so arranged as to project a suitable distance into the interior of said casing where it has fixed upon it a spur gear 25. 26 indicates a shaft coaxially alined with respect to the drive shaft 12 and which is journaled in an anti-friction bearing provided in the extension 23. Said shaft 26 extends at its rear end into the differential gear housing 16 where it has attached to it a gear (not shown) associated with the differential gearing located within said housing. The forward end of said shaft 26 projects into the interior of the casing 18 and is coaxially recessed to receive and to form a bearing for the reduced end 12ˣ of the drive shaft 12. Mounted upon said shaft 26 so as to rotate therewith, but capable of an endwise movement thereon, is a spur gear 27 which is larger in diameter than the gear 25 fixed on the driving shaft 12. Each gear, 25 and 27, is provided on their adjacent faces with clutch members 25ª, 27ª, and the gear 27 is provided on its opposite or rear face with an integral annularly grooved collar 27ᵇ by means of which an endwise movement is imparted to it upon said shaft.

28 indicates a fork arm (see Fig. 4) which is operatively engaged with the collar 27ᵇ and which is fixed to a longitudinally extending shift rod 29 having a sliding bearing in the end walls 19 and 20 of said casings. The forward end of said rod is operatively connected to an operating lever (not shown) conveniently located with respect to the controlling mechanism of the automobile.

30 indicates a short shaft which is spaced from and parallel with the coaxial shafts 12, 25, and located in the same horizontal plane thereof. Said shaft is journaled in suitable anti-friction bearings fixed in the end walls 19 and 20 of the casing 18. Fixed to said shaft near the front wall 19 of the casing is a spur gear 31 which meshes with the gear 25 of the shaft 12, said gear 31 being of approximately the same size as that of the gear 27 before mentioned. Fixed on said shaft but spaced from the gear 31 thereon, toward the rear end wall 20, is provided a second gear 32, which is adapted to be enmeshed with the gear 26 before mentioned. The gear case 18 has an aperture 33 in its top wall which is closed by a removable cover plate 33ª for the purpose of inspection and repair.

It is apparent from the foregoing description and accompanying drawings that when an endwise movement is imparted to the rod 29, the gear 27 is moved endwise on the shaft 26 into and out of mesh with the gear 32 and into and out of clutching engagement with the gear 25 on the drive shaft 12 and thus cause the shaft 26 to rotate at a slower speed (through the reduction in gearing described) than the drive shaft 12 or in unison therewith.

As an example of the operation of my improved device the normal position of the gears within the casing is that shown in Fig. 3 with the gear 27 locked to the gear 25 on the drive shaft 12 by means of the associated clutch members 25ª, 27ª, on said gears. The rotation of the drive shaft 12 is in ratio of about one to eight with the crank shaft of the engine (not shown), the reduction being brought about by the speed transmission device 10 before mentioned and with which or an equivalent, nearly all automobiles are equipped. A further gear reduction is had in the differential gear casing before the driving power is imparted to the rear axle 14, as is well known. Traveling along on low speed, the car approaches a steep hill or a bad stretch of road and the resistance met with puts a great load on the motor and tends to stall the same even on the low gear at which it is running. Unless a further reduction of gearing ratio is to be had between the axle and the crank shaft of the operating engine, the car is unable to be driven over the bad stretch of road ahead. When such conditions are met with in an automobile equipped with my improved device, a longitudinal rearward movement is imparted to the rod 29 (by its operating lever adjacent the driver) which movement through the fork 28 causes the clutching engagement between the gears 25 and 27 to be broken and the gear 27 being moved into mesh with the gear 32. Through the reduction gearing before described, the shaft 26 now rotates at about one half the speed of the drive shaft 12 or at about a ratio of one to sixteen relative to the engine crank shaft. When the engine is thus relieved of a great load (through the reduction of gearing to the rear axle), the bad stretch of road can be negotiated with ease. When a normal condition of road is again met with, the gear 27 may be unmeshed from the gear 32 and again moved into clutching engagement with the gear 25 by a reverse longitudinal movement of the shifting rod 29, and the shafts 12 and 26 will again rotate in unison and in accordance with the proper reduction of gearing imparted to them by the speed transmission device 10. In like manner the intermediary speeds between high speed and low speed may be produced so that the car may be run over heavy roads and over moderate grades without the necessity of throwing in the low speed.

One of the advantages gained with my improved change-speed device in the form of an attachable mechanism, is that the economical production of the car is conserved in the adoption of a less expensive transmission device which operates satisfactorily under ordinary conditions, and when other conditions arise as a consequence of change of use or environment of the automobile, a means is at hand for coping with the changes met with and still retaining the same method of operation to which the driver has been accustomed. Confusion is thus avoided with less liability of accidents.

Herein I have illustrated specifically a gear reduction device, but it will be manifest that a like result may be obtained by including in the combination a speed increasing device and where the term speed reduction is used in the claims, it is to be understood broadly and as for the purpose of including both types of change-speed devices.

It is apparent that any suitable ratio of gears within the casing 18 may be used without departing from the spirit of the invention, and while in describing my invention, I have referred to certain details of mechanical construction and arrangement of parts, I do not wish to be limited thereby except as may be pointed out in the appended claim.

I claim as my invention:

The combination of a change-speed transmission device, of a driven shaft and a housing for said shaft, of a shaft intermediate said transmission device and said driven shaft, and a housing for said intermediate shaft, a casing adapted to be interposed between said shaft housings and attached thereto, of an auxiliary change-speed device within said casing connecting said intermediate shaft to said driven shaft, and of means for independently controlling said auxiliary change-speed device adapted to secure speed reductions for each speed produced in the intermediate shaft by the transmission device.

In testimony, that I, claim the foregoing as my own invention I affix my signature in the presence of two witnesses, this 13th day of September A. D. 1915.

EDGAR B. TOLMAN, Jr.

Witnesses:
T. H. ALFREDS,
KARL W. DOLL.